Figures 1, 2, 3, 4, 5:
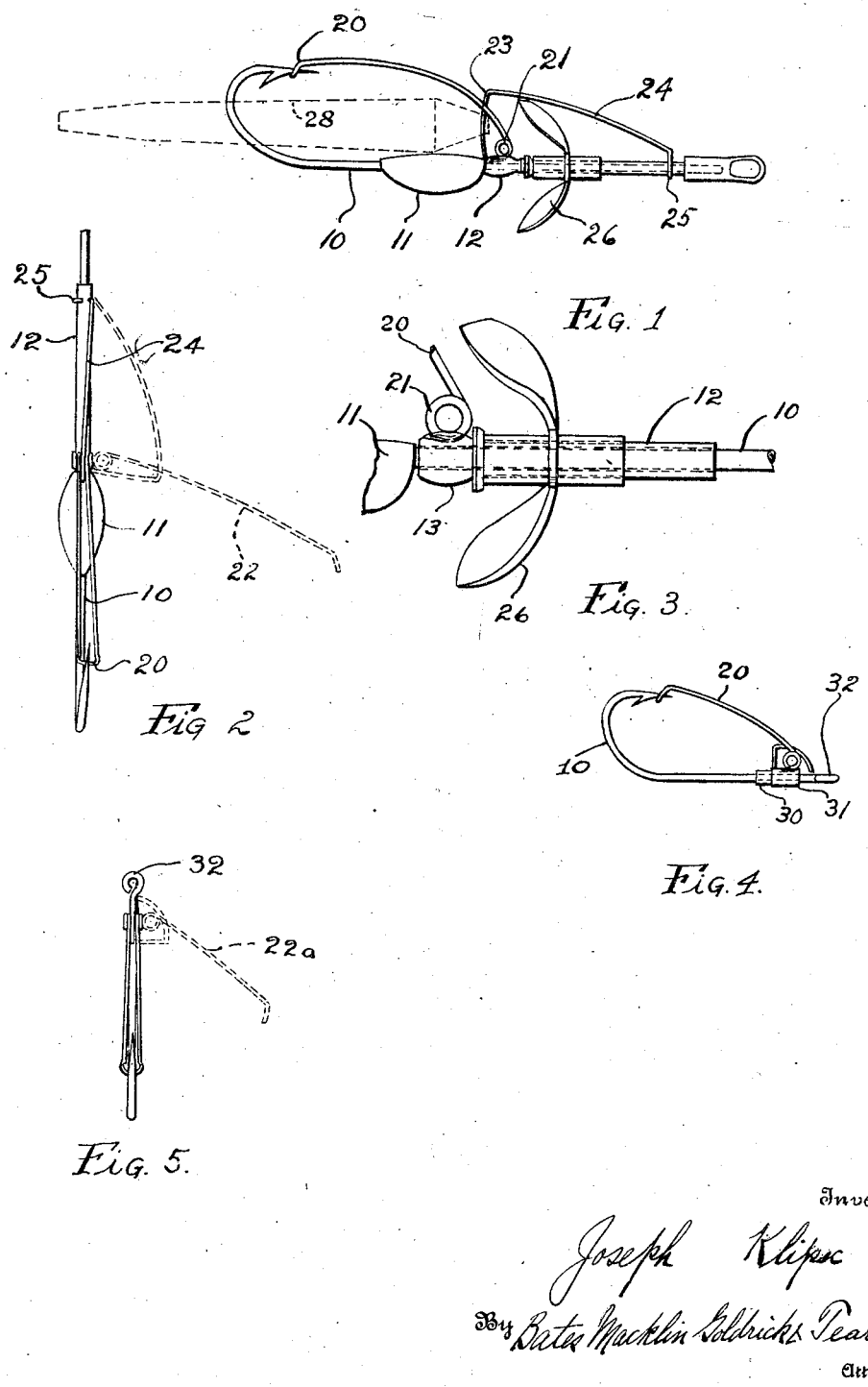

May 24, 1927.

J. KLIPEC

GUARD FOR FISHHOOKS

Filed Nov. 21, 1924

1,629,510

Inventor
Joseph Klipec
By Bates, Macklin, Goldrick & Peare
Attorney

Patented May 24, 1927.

1,629,510

UNITED STATES PATENT OFFICE.

JOSEPH KLIPEC, OF CLEVELAND, OHIO.

GUARD FOR FISHHOOKS.

Application filed November 21, 1924. Serial No. 751,212.

Weed guards heretofore used have usually been rigidly mounted upon the shank of a fish hook and have embodied a strip of wire which extends along the shank of the hook and terminates adjacent the point thereof. When a fish is caught however, the wire is frequently deformed while removing the hook from the mouth of the fish. If the guard is permanently attached to the hook this necessitates a replacement of an entire hook.

One of the objects of my invention therefore is the provision of a guard which may be swung outwardly and away from the point of the hook whenever the hook is taken by a fish. Moreover my invention contemplates the construction of a guard which is well adapted for the use of a pork rind bait, either with or without the use of the guard.

I carry out the above objects by providing a sleeve which is mounted on the shank of the hook and is rotatable with reference thereto. The sleeve carries the guard, which in the preferred form comprises a strip of wire bent intermediately so as to engage beneath the point of the hook when in closed position. The construction of the guard is such that, whenever it is released from the point of the hook, it is automatically swung outwardly therefrom, and maintained out of reach of any fish which may take the hook.

The preferred form for carrying out my invention is illustrated in the drawings wherein Fig. 1 is a side elevation of a hook embodying my invention; Fig. 2 is a plan view of the hook shown in Fig. 1 and illustrating two positions of the guard; Fig. 3 is a detailed view on an enlarged scale showing a portion of the hook; Fig. 4 is a side elevation illustrating a modification of my invention; and Fig. 5 is a plan view of the hook shown in Fig. 4.

Referring now to Fig. 1, I have shown the hook as having a shank 10 and weight 11 which functions to maintain the point of the hook in upright position. The weight also functions as a shoulder against which a sleeve 12 is arranged to engage. The sleeve is rotatably mounted upon the shank of the hook and is adapted to carry the weed guard.

The guard shown in Figs. 1 and 2 comprises a strip of spring wire which is bent intermediately to form a loop 20 arranged to engage beneath the point of the hook. By looping the wire as at 21 and rigidly securing it to the sleeve, I obtain a guard which is normally urged into engagement with the point of the hook by the resilient characteristics of the metal. As a result of this construction the guard, when pressed downwardly against the shank of the hook and then released is caused to fly outwardly and to assume the position shown by the broken lines 22 in Fig. 2.

To provide means for enabling the use of a pork rind in connection with the guard, I have illustrated the guard as having one of the ends thereof extending upwardly as at 23 and then forwardly as at 24, and looping over the sleeve as at 25. The laterally extending portion 23 then provides a convenient support for holding a pork rind (indicated by the broken lines 28 in Fig. 1), particularly since the end 25 may be detached from the sleeve, and the rind may be readily placed thereon. If the spinner indicated at 26 in Fig. 1 is employed, then the forwardly extending portion 24 provides a satisfactory weed guard for the spinner.

Referring now to Fig. 4, I have shown a modified construction wherein a collar 30 is rigidly mounted upon the hook, while a sleeve 31 is rotatably mounted upon the shank of the hook intermediate the collar and the eye 32. In this modification the spinner is not employed, but the guard is still free to move outwardly as indicated at 22$^a$ whenever it is detached from the point of the hook.

In view of the foregoing description it will be evident that my invention provides a weed guard which is quite simple in construction and may be readily assembled, yet which overcomes a serious objection to the use of weed guards heretofore employed. This arrangement moreover permits the use of a hook without necessitating the use of the guard, thus enabling the hook to be used when fishing over rocks without requiring the substitution of the entire hook.

I claim:

1. The combination of a hook having an eye at the end of its shank and a fixed shoulder on the shank, a sleeve rotatably and slidably mounted on the shank between the eye and the shoulder, and a weed guard comprising a wire loop intermediately curled on itself, such curled portion being attached to the sleeve and one arm of the wire extending from the curled portion toward the point of the hook and being adapted to engage beneath it and the other arm of the wire extending from the curled portion first outwardly then backwardly beyond the curled portion and functioning to provide a bait support.

2. In combination, a fish hook having a shoulder thereon, a sleeve rotatable on the shank of the hook, said shoulder being adapted to limit movement of the sleeve longitudinally of the hook, a spinner on said sleeve, a weed guard carried by the sleeve and embodying a strip of flexible wire shaped in the form of a loop, said loop engaging beneath the point of the hook when in closed position and said guard having a portion thereof projecting forwardly of the shoulder and providing a weed guard for the spinner.

In testimony whereof, I hereunto affix my signature.

JOSEPH KLIPEC.